(12) United States Patent
Slack et al.

(10) Patent No.: US 6,797,799 B1
(45) Date of Patent: Sep. 28, 2004

(54) HIGH 2,4'-DIPHENYLMETHANE DIISOCYANATE CONTENT PREPOLYMERS

(75) Inventors: William E. Slack, Moundsville, WV (US); Edward P. Squiller, Bridgeville, PA (US); P. Richard Hergenrother, Gibsonia, PA (US)

(73) Assignee: Bayer Materialscience LLC, Pittsburgh, PA (US)

( * ) Notice: Subject to any disclaimer, the term of this patent is extended or adjusted under 35 U.S.C. 154(b) by 0 days.

(21) Appl. No.: 10/405,545

(22) Filed: Apr. 2, 2003

(51) Int. Cl.[7] .......................... C08G 18/76; C08G 18/48
(52) U.S. Cl. ................. 528/60; 252/182.2; 252/182.21; 252/182.22; 428/423.1; 428/425.5; 428/425.6; 428/425.8; 528/49; 528/59; 528/66; 528/67; 528/76; 528/77; 560/25; 560/26
(58) Field of Search ......................... 252/182.2, 182.21, 252/182.22; 528/49, 59, 60, 66, 67, 76, 77; 560/25, 26; 428/423.1, 425.5, 425.6, 425.8

(56) References Cited

U.S. PATENT DOCUMENTS

| | | | |
|---|---|---|---|
| 3,278,457 A | 10/1966 | Milgrom | 528/412 |
| 3,278,458 A | 10/1966 | Belner | 528/412 |
| 3,278,459 A | 10/1966 | Herold | 528/412 |
| 3,427,256 A | 2/1969 | Milgrom | 502/150 |
| 3,427,334 A | 2/1969 | Belner | 556/31 |
| 3,427,335 A | 2/1969 | Herold | 549/206 |
| 3,769,318 A | 10/1973 | Windemuth et al. | 560/24 |
| 3,829,505 A | 8/1974 | Herold | 568/606 |
| 3,941,849 A | 3/1976 | Herold | 528/92 |
| 4,160,080 A | 7/1979 | Köenig et al. | 528/59 |
| 4,177,342 A | 12/1979 | Bock et al. | 528/45 |
| 4,355,188 A | 10/1982 | Herold et al. | 568/620 |
| 4,472,560 A | 9/1984 | Kuyper et al. | 526/120 |
| 4,532,266 A | 7/1985 | Rasshofer et al. | 521/159 |
| 4,721,818 A | 1/1988 | Harper et al. | 568/120 |
| 4,843,054 A | 6/1989 | Harper | 502/175 |
| 5,124,427 A | 6/1992 | Potter et al. | 528/67 |
| 5,208,334 A | 5/1993 | Potter et al. | 544/193 |
| 5,235,018 A | 8/1993 | Potter et al. | 528/49 |
| 5,319,053 A | 6/1994 | Slack et al. | 528/48 |
| 5,319,054 A | 6/1994 | Slack et al. | 528/48 |
| 5,440,003 A * | 8/1995 | Slack | 528/48 |
| 5,459,221 A * | 10/1995 | Narayan et al. | 528/67 |
| 5,491,252 A * | 2/1996 | Narayan et al. | 560/26 |
| 5,530,085 A * | 6/1996 | Giorgini | 528/59 |
| 5,567,793 A * | 10/1996 | Slack et al. | 528/69 |
| 5,584,958 A | 12/1996 | Gillis et al. | 156/331.4 |
| 5,585,452 A * | 12/1996 | Hurley et al. | 528/67 |
| 5,648,445 A | 7/1997 | Slack et al. | 528/49 |
| 5,663,272 A | 9/1997 | Slack et al. | 528/69 |
| 5,677,413 A | 10/1997 | Barksby et al. | 528/65 |
| 5,705,593 A | 1/1998 | Schmalstieg et al. | 528/45 |
| 5,821,316 A | 10/1998 | Quay et al. | 528/64 |
| 6,077,456 A * | 6/2000 | Narayan | 252/182.22 |
| 6,262,139 B1 * | 7/2001 | Narayan et al. | 521/159 |
| 6,368,714 B1 | 4/2002 | Robertson et al. | 428/425.1 |

FOREIGN PATENT DOCUMENTS

EP  0 573 206  8/1998

* cited by examiner

*Primary Examiner*—Rabon Sergent
(74) *Attorney, Agent, or Firm*—Joseph C. Gil; John E. Mrozinski, Jr.

(57) ABSTRACT

The present invention provides NCO prepolymers comprising the reaction product of (1) an allophanate-modified diphenylmethane diisocyanate having an NCO group content of 12 to 32.5% by weight and comprising the reaction product of,
   (a) an aliphatic alcohol or an aromatic alcohol; and
   (b) diphenylmethane diisocyanate comprising:
      (i) from 10 to 60% by weight of 2,4'-diphenylmethane diisocyanate,
      (ii) less than 6% by weight of 2,2'-diphenylmethane diisocyanate, and
      (iii) the balance being 4,4'-diphenylmethane diisocyanate,
   wherein the sum of the percentages by weight of (1)(b)(i), (1)(b)(ii), and (1)(b)(iii) total 100% by weight of (1)(b), and
(2) a polyether polyol having a molecular weight of 134 to 10,000, an OH number of 420 to 14, and a functionality of at least 1.8.

The NCO prepolymers of the present invention find use in preparing elastomeric coatings, adhesives, sealants, and the like.

13 Claims, No Drawings

HIGH 2,4'-DIPHENYLMETHANE DIISOCYANATE CONTENT PREPOLYMERS

FIELD OF THE INVENTION

The present invention relates, in general, to polyurethane, and more specifically, to an NCO prepolymer having a high content of 2,4'-diphenylmethane diisocyanate (MDI). The NCO prepolymer of the present invention is particularly useful in making elastomeric coatings, adhesives, sealants and the like.

BACKGROUND OF THE INVENTION

European Patent No. EP 0,573,206 B1, issued to Barksby, discloses polyurethane prepolymers made by reacting a polyether polyol mixture with a polyisocyanate. The polyol mixture of Barksby includes, a) a polyether diol, and b) a polyether polyol having 3 or more hydroxyl groups.

U.S. Pat. No. 5,663,272, issued to Slack et al., discloses allophanate-modified methylene diphenyl diisocyanate (MDI) which is produced by reacting a monoisocyanate and an organic material having at least two hydroxyl groups and a molecular weight of from about 60 to about 6,000 to form a urethane. The urethane is reacted with an isomeric mixture of MDI in an amount such that the product isocyanate has an NCO content of from about 12 to about 30%. The isomeric mixture of MDI is composed of 4,4'-MDI containing from 0 to about 60% by weight 2,4'-MDI and less than 6% by weight of the 2,2'-MDI. The allophanate-modified MDI of Slack is reacted with an organic isocyanate-reactive material to produce an allophanate-modified MDI prepolymer containing urethane, urea and/or biuret groups having an NCO content which is generally from about 5 to about 29% by weight.

U.S. Pat. No. 5,677,413, issued to Barksby et al., discloses polyurethane elastomers prepared from ultra-low unsaturation polyoxypropylene polyols containing up to 20 weight percent internal random oxyethylene moieties. The internal polyoxyethylene moiety-containing polyoxypropylene polyols of Barksby are used to prepare ultra-low unsaturation polyoxyethylene capped polyols, which are haze-free, and may be used to prepare haze-free 4,4'-MDI prepolymers.

U.S. Pat. No. 5,821,316 issued to Quay et al., discloses polyurethane prepolymers made from toluene diisocyanate (TDI) and a blend of two polyols, a) a polyether polyol of 350–2000 equivalent weight and, b) a low molecular weight polyol of 62 to <300 molecular weight, in an equivalent ratio of low molecular weight polyol to polyether polyol of 0.25–2.7:1. The prepolymers are used to produce elastomers that are said by Quay to have good dynamic properties.

U.S. Pat. No. 6,368,714 issued to Robertson et al., discloses moisture-activated adhesive compositions made from 2,4'-MDI. Robertson states that the polyisocyanates used in the invention should have a 2,4'-MDI content of less than 18.0%, preferably less than 10% and most preferably less than 5%.

As those skilled in the art are aware, in general the 2,4'-MDI isomer has a slower reactivity and good liquidity at low temperatures, but yields products which possess poor tensile and tear strengths. Products made from the 4,4'-MDI isomer have good tensile and tear strengths, but its fast reactivity and poor liquidity at low temperatures limit use of the 4,4'-MDI isomer.

Therefore, a need exists in the art for an NCO prepolymer having the low temperature liquidity and slower reactivity of 2,4'-MDI based prepolymers which is capable of producing a finished product with the better tensile strength and tear strength seen in articles made from 4,4'-MDI prepolymers.

SUMMARY OF THE INVENTION

Accordingly, the present invention reduces or eliminates the problems inherent in the art by providing an NCO prepolymer which combines the low temperature liquidity and slower reactivity of a 2,4'-MDI prepolymer with the ability to produce a product having the better tensile and tear strength characteristics as is seen in articles made from a 4,4'-MDI prepolymer.

Elastomeric coatings, adhesives, sealants and the like may be prepared from the NCO prepolymers of the present invention.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about."

The present invention provides NCO prepolymers containing the reaction product of, (1) an allophanate-modified diphenylmethane diisocyanate having an NCO group content of 12 to 32.5% by weight and comprising the reaction product of,
   (a) an aliphatic alcohol or an aromatic alcohol; and
   (b) diphenylmethane diisocyanate comprising:
      (i) from 10 to 60% by weight of 2,4'-diphenylmethane diisocyanate,
      (ii) less than 6% by weight of 2,2'-diphenylmethane diisocyanate, and
      (iii) the balance being 4,4'-diphenylmethane diisocyanate,
   wherein the sum of the percentages by weight of (1)(b)(I), (1)(b)(ii) and (1)(b)(iii) total 100% by weight of (1)(b), and (2) a polyether polyol having a molecular weight of 134 to 10,000, an OH number of 420 to 14 and a functionality of at least 1.8.

Also provided are coating compositions (and coated substrates) containing the NCO prepolymer of the present invention combined with an isocyanate reactive component comprising, (1) from 30–80% by weight, based on 100% by weight (B), of a high molecular weight hydroxyl-terminated polyether polyol having a molecular weight of 400 to 4000 g/mol and having a functionality of 2, and (2) from 70–20% by weight, based on 100% by weight (B), of a high molecular weight hydroxyl-terminated polyether polyol having a molecular weight of 400 to 6000 g/mol and having a functionality of 3;

at an isocyanate index of 70 to 130. The reaction of the NCO prepolymer of the present invention and the isocyanate reactive component may optionally occur in the presence of a catalyst and a desiccant.

Allophanates and methods of making them are well known in the art and are described in numerous patents including U.S. Pat. No. 3,769,318, U.S. Pat. Nos. 4,160,086, 4,177,342, 5,319,053 and 5,663,272. Allophanate-modified methylene diphenyl diisocyanates are also available commercially.

Polyether polyols may preferably be obtained in known manner by the reaction of starting compounds which contain reactive hydrogen atoms with alkylene oxides, including but not limited to, ethylene oxide, propylene oxide, butylene oxide, styrene oxide, tetrahydrofuran, epichlorohydrin or mixtures thereof. Minor amounts (up to 20% by weight, based on the weight of the polyol) of ethylene oxide may also be used. However, if ethylene oxide is used, it is preferably used as the initiator for or to cap the polypropylene oxide groups.

Methods for preparing polyether polyols are described, for example, in EP-A 283 148, U.S. Pat. Nos. 3,278,457, 3,427 256, 3,829,505, 4,472,560, 3,278,458, 3,427,334, 3,941,849, 4,721,818, 3,278,459, 3,427,335 and 4,355,188. Such polyether polyols may preferably be prepared using double metal cyanides as catalysts.

Examples of starter molecules for producing suitable polyols include, but are not limited to, diols such as ethylene glycol, propylene glycol, 1,3-butanediol, 1,4-butanediol, 1,6 hexanediol, 2-ethylhexanediol-1,3, and primary monoamines such as aliphatic amines, e.g. ethylamine or butylamine. Also suitable are polyethylene glycols and polypropylene glycols, polyhydric alcohols, water, methanol, ethanol, 1,2, 6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)-ethane.

Polyethers obtained by the reaction of starting compounds containing amine compounds may also find use in the present invention. Amine starting compounds include, but are not limited to, ammonia, methyl amine, tetramethylene diamine; ethanolamine, diethanolamine, triethanolamine, ethylene diamine, diethylene triamine, triethylene tetramine, 1,6-hexane diamine, piperazine, 2,5-dimethyl piperazine, 1-amino-3aminomethyl-3,3,5-trimethyl cyclohexane, bis-(4-aminocyclohexyl)-methane, bis-(4-amino-3-methylcyclohexyl)-methane, 1,4-cyclohexane diamine, 1,2-propane diamine, hydrazine, aminoacid hydrazides, hydrazides of semicarbazido carboxylic acids, bis-hydrazides, bis-semicarbazides, aniline, phenylene diamine, 2,4- and 2,6-toluylene diamine, polyphenylene polymethylene polyamines of the kind obtained by the aniline/formaldehyde condensation reaction and mixtures thereof. Resinous materials such as phenol and cresol resins also may be used as the starting materials.

Polyethers that have been modified by vinyl polymers may also find use in the present invention. Such modified polyethers may preferably be obtained by polymerizing, e.g. styrene and acrylonitrile in the presence of polyethers (U.S. Pat. Nos. 3,383,351; 3,304,273; 3,523,095; 3,110,695 and German Patent No. 1,152,536). Also suitable as polyethers are amino polyethers wherein at least a portion of the hydroxyl groups of the previously described polyethers are converted to amino groups.

In addition to the polyether polyols, minor amounts (up to 20% by weight, based on the weight of the polyol) of low molecular weight dihydric and trihydric alcohols having a molecular weight of 32 to 500 may also be used. Examples include, but are not limited to, ethylene glycol, 1,3-butandiol, 1,4-butandiol, 1,6-hexandiol, glycerine or trimethylolpropane.

In addition to the above-mentioned components, which are preferably difunctional in the isocyanate polyaddition reaction, monofunctional and even small portions of trifunctional and higher functional components generally known in polyurethane chemistry, such as trimethylolpropane, may be used in special cases wherein slight branching of the prepolymer is desired. However, those prepolymers are preferably substantially linear. Such linearity may be achieved by maintaining the average functionality of the prepolymer starting components below 2.1.

Aliphatic alcohols suitable in the present invention include, but are not limited to, isomeric butanols, isomeric propanols, isomeric pentanols, isomeric hexanols, cyclohexanol, 2-methoxyethanol, 2-bromoethanol, etc. Aromatic alcohols suitable in the present invention include, but are not limited to phenol, 1-naphthanol, m-cresol and p-bromophenol. The aliphatic alcohols are particularly preferred.

Catalysts capable of catalyzing the reaction between the isocyanate groups and isocyanate-reactive groups include metal carboxylates, metal halides, ammonium carboxylates, and mixtures thereof. Of the metal halides, the metal chlorides are preferred. These catalysts may be used alone or in conjunction with a tin-sulfur catalyst and/or a tertiary amine catalyst.

Examples of suitable metal carboxylates are tin carboxylates such as dimethyltin dilaurate and bismuth carboxylates such as bismuth tri-neodecanoate. Suitable metal halides include tin halides, especially tin chlorides such as dimethyltin dichloride. Examples of suitable ammonium carboxylates are trimethylhydroxyethylammonium-2-ethylhexanoate (i.e. Dabco TMR). Tin carboxylates such as dimethyltin dilaurate and bismuth carboxylates such as bismuth tri-neodecanoate are preferred catalysts. Metal chlorides such as dimethyltin dichloride are also preferred catalysts.

Suitable tin-sulfur catalysts include dialkyltin dilaurylmercaptides such as dibutyltin dilaurylmercaptide and dimethyftin dilaurylmercaptide.

Suitable tertiary amine catalysts include triethylamine, triethylenediamine, tributylamine, N-methylmorpholine, N-ethylmorpholine, triethanolamine, truisopropanol-amine, N-methyldiethanolamine, N-ethyidiethanolamine, and N,N-dimethylethanolamine.

Suitable desiccants as known in the art may be used.

The invention is further illustrated but is not intended to be limited by the following examples in which all parts and percentages are by weight unless otherwise specified.

EXAMPLES

The following components were used to make the NCO prepolymers of the present invention:

Polyol A:

Acclaim 4200, a propylene oxide polyol, commercially available from Bayer Polymers LLC, having an OH number of about 28 and a functionality of about 1.98.

MDI-x:

Diphenylmethane diisocyanate which contains less than 3% by weight 2,2'-diphenylmethane diisocyanate and in which x represents the percent by weight 2,4'-diphenylmethane diisocyanate and 100-x represents the percent by weight 4,4'- and 2,2'-diphenylmethane diisocyanate.

Catalyst A:

zinc acetylacetonate.

Prepolymers

The following NCO prepolymers were made as described in detail herein below.

Prepolymer A

To 50.8 parts of MDI-2 at 60° C. were added 49.2 parts of Polyol A. The mixture was heated to 60–65° C. for two hours followed by cooling to 25° C. The final product had an NCO content of 16.1% and a viscosity at 25° C. of 623 mPa s.

Prepolymer B

To 50.8 parts of MDI40 at 60° C. were added 49.2 parts of Polyol A. The procedure used to make Prepolymer A was followed. The final product had an NCO content of 16.1% and a viscosity at 25° C. of 596 mPa s.

Prepolymer C

To 66.8 parts of MDI-2 at 50° C. were added 2.1 parts isobutanol. The mixture was heated to 90° C. Catalyst A (75 ppm) was added and the reaction mixture held at 90° C. for one and a half hours. Benzoyl chloride (150 ppm) was added. The allophanate-modified MDI had an NCO content of 29.0% by weight. This allophanate-modified MDI was cooled to 60° C. and 31.1 parts of Polyol A were added. The reaction mixture was held at 60–65° C. for two hours and then cooled to 25° C. The resulting prepolymer had an NCO content of 19.1% and a viscosity at 25° C. of 384 mPa s.

Prepolymer D

The procedure described above for Prepolymer C was repeated except, MDI-2 was replaced by MDI-30. The resulting allophanate-modified prepolymer had an NCO content of 18.9% and a viscosity at 25° C. of 450 mPa s.

Prepolymer E

To 27.75 parts of MDI-2 at 50° C. were added 2.1 parts isobutanol. The mixture was heated to 90° C. Catalyst A (75 ppm) was added and the reaction mixture held at 90° C. for one and a half hours. Benzoyl chloride (150 ppm) was added. The allophanate-modified MDI had an NCO content of 23.0% by weight. This allophanate-modified MDI was cooled to 60° C. and 39.0 parts of MDI-52 was added. The resulting blend had an NCO content of 29.0%. To this blend at 60° C. were added 31.1 parts of Polyol A. The reaction mixture was held at 60–65° C. for two hours and then cooled to 25° C. The resulting allophanate-modified prepolymer had an NCO content of 19.0% and a viscosity at 25° C. of 510 mPa s.

Mechanical Properties

Elastomeric coatings, adhesives, sealants and the like may be prepared from the NCO prepolymers of the present invention using, for example, a polyol component blend that includes the following:

750 parts by weight of polyether polyol B (molecular weight of about 440; functionality of about 3; and an OH number of about 370);

500 parts by weight of polyether polyol C (molecular weight of about 2000; functionality of about 2 and an OH number of about 56); and 126 parts by weight of a desiccant made from 3 Å molecular sieves and castor oil (Baylith L paste).

Samples of the NCO prepolymers made above were prepared for testing at 25° C. in the following manner:

The stated amount (as shown in Table I) of the polyol component blend described above was weighed into a 500 mL plastic cup. The appropriate amount of the NCO prepolymer (A–E) was weighed into the plastic cup that contained the polyol component blend. The NCO prepolymer and polyol component blend were mixed by hand-stirring with a wooden spatula for approximately 20 seconds. The resulting mixture was drawn down on glass plates using a 10 mil thick draw-down bar. Samples of the compositions were cured at 60° C. for 16 hours, followed by storage at 25° C. at 50% relative humidity for two weeks.

TABLE I

| Prepolymer | Polyol Blend | Catalyst XC6212 |
| --- | --- | --- |
| A (274 g) | 244 g | 5.2 g |
| B (274 g) | 244 g | 5.2 g |
| C (231 g) | 244 g | 4.7 g |
| D (233 g) | 244 g | 4.8 g |
| E (232 g) | 244 g | 4.8 g |

Tensile and tear strength, percent elongation and Shore Hardness A/D, of the samples cured at 60° C. were tested and the results summarized in Table II. Tensile strength and percent elongation were determined according to ASTM D-412 C. Tensile strength is reported in pounds per square inch (psi). Tear strength was determined according to ASTM D-624. Tear strength is reported in pounds per linear inch (pli). Shore Hardness A/D was determined according to ASTM D-2240.

TABLE II

| Mechanical Property | Cure at 60° C. Prepolymer | | | | |
| --- | --- | --- | --- | --- | --- |
| | A | B | C | D | E |
| Shore Hardness A/D | 95/25 | 69/20 | 96/48 | 95/42 | 94/42 |
| Tear Strength (pli) | 50 | 58 | 155 | 167 | 167 |
| Tensile Strength (psi) | 1122 | 440 | 2837 | 2697 | 2658 |
| Percent Elongation | 120 | 207 | 134 | 169 | 166 |
| Gel Time (min.) | n.a. | 22 | 7.2 | 13 | 14.5 |

As can be appreciated by reference to Table II, the NCO prepolymers of the present invention retain the slower reactivity typically seen in a 2,4'-MDI prepolymer. Articles made with the urethane prepolymers having a high 4,4'-MDI content (Prepolymer A) and from high 2,4'-MDI content (Prepolymer B), show the expected better hardness and tensile strength of the 4,4'-MDI prepolymer A and the better elongation of the 2,4'-MDI prepolymer B. However, when the prepolymers are made from allophanate-modified MDI of the present invention, not only do the properties of the film prepared from the 4,4'-MDI modified allophanate improve significantly, the high 2,4'-MDI modified allophanate prepolymers show the same large improvement in strength properties while maintaining the higher elongation expected of high 2,4'-MDI prepolymers. Thus, the allophanate-modified NCO prepolymers of the present invention advantageously combine the superior properties (low temperature liquidity and slower reactivity) of a 2,4'-MDI based prepolymer with the capability of making a product having the equivalent hardness, tensile, elongation and tear strength characteristics seen in products made from an allophanate-modified 4,4'-MDI based prepolymer.

Comparing, again by reference to Table II, articles made from allophanate-modified 4,4-MDI Prepolymer C to articles made from allophanate-modified high 2,4'-MDI Prepolymers D and E, one skilled in the art will appreciate the lack of differences in mechanical properties of articles made therefrom, except the high 2,4' type allophanates demonstrated better elongation as seen with high 2,4'-MDI content Prepolymer B. A comparison of the effect of making an allophanate from MDI with a high 2,4'-MDI monomer (Prepolymer D) and an allophanate made from 4,4'-MDI and blending back with high 2,4'-MDI (Prepolymer E) showed, by reference to Table II, that the properties of articles made from those prepolymers were very similar.

The NCO prepolymers of the present invention may preferably be used in the preparation of elastomeric coatings, adhesives, sealants and the like. Depending upon the particular application, compositions containing the NCO prepolymers of the present invention may also contain additives commonly used in the art including, but not limited to, leveling agents, wetting agents, flow control agents, antiskinning agents, antifoaming agents, fillers (such as silica, aluminum silicates and high-boiling waxes), viscosity regulators, plasticizers, pigments, dyes, UV absorbers. Stabilizers against thermal and/or oxidative degradation may also be incorporated as needed.

The elastomeric coatings, adhesives, sealants and the like containing the NCO prepolymers of the present invention may preferably be applied to any heat-resistant substrate including, but not limited to, metal, glass and ceramic. Such application may preferably be by methods known in the art including, but not limited to, spray-coating, spread-coating, flood-coating, dip-coating, roll-coating and casting. The coatings, adhesives, sealants and the like containing the NCO prepolymers of the present invention may be clear or pigmented.

The foregoing descriptions of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A coating composition comprising the reaction product of:
   (A) an allophante-modifted diphenylmethane diisocyanate (MDI) NCO prepolymer comprising the reaction product of,
      (1) an allophante-modified diphenylmethane diisocyanate having an NCO group content of about 12 to about 32.5% by weight and comprising the reaction product of,
         (a) an allphatio alcohol or an aromatic alcohol; and
         (b) diphenylmethane diisocyanate comprising:
            (i) from about 10 to about 60% by weight of 2,4'-diphenylmethane diisocyanate,
            (ii) less than about 6% by weight of 2,2'-diphenylmethane diisocyanate, and
            (iii) the balance being 4,4'-diphenylmethane diisocyanate,
         wherein the sum of the percentages by weight of (1)(b)(i), (1)(b)(ii) and (1)(b)(iii) total 100% by weight of (1)(b), and
      (2) a polyether polyol having a molecular weight of about 134 to about 10,000, an OH number of about 420 to about 14 and a functionality of at least about 1.8; and
   (B) an isocyanate reactive component comprising,
      (1) from 30–80% by weight, based on 100% by weight (B), of a high molecular weight hydroxyl-terminated polyether polyol having a molecular weight of about 400 to about 4000 g/mol and having a functionality of about 2, and
      (2) from 70–20% by weight, based on 100% by weight (B), of a high molecular weight hydroxyl-terminated polyether polyol having a molecular weight of about 400 to about 6000 g/mol and having a functionality of about 3,
   at an isocyanate index of about 70 to about 130.

2. The coating composition of claim 1, wherein the reaction of (A) and (B) occurs in the presence of at least one of a catalyst and/or a desiccant.

3. The coating composition of claim 1, wherein the isocyanate index is about 80 to about 110.

4. The coating composition of claim 1, wherein the isocyanate index is about 90 to about 105.

5. The coating composition of claim 1, wherein the aliphatic or aromatic alcohol is selected from the group consisting of isomeric butanols, isomeric propanols, isomeric pentanols, isomeric hexanols, cyclohexanol, 2-methoxyethanol, 2-bromoethanol, phenol, 1-naphthanol, m-cresol and p-bromophenol.

6. A coated substrate comprising a substrate having applied thereto a coating comprising the reaction product of,
   (A) an allophanate-modified diphenylmethane diisocyanate (MDI) NCO prepolymer comprising the reaction product of,
      (1) an allophanate-modified diphenylmethane diisocyanate having an NCO group content of about 12 to about 32.5% by weight and comprising the reaction product of,
         (a) an aliphatic alcohol or an aromatic alcohol; and
         (b) diphenylmethane diisocyanate comprising:
            (i) from about 10 to about 60% by weight of 2,4'-diphenylmethane diisocyanate,
            (ii) less than about 6% by weight of 2,2'-diphenylmethane diisocyanate, and
            (iii) the balance being 4,4'-diphenylmethane diisocyanate,
         wherein the sum of the percentages by weight of (1)(b)(i), (1)(b)(ii) and (1)(b)(iii) total 100% by weight of (1)(b), and
      (2) a polyether polyol having a molecular weight of about 134 to about 10,000, an OH number of about 420 to about 14 and a functionality of at least about 1.8; and
   (B) an isocyanate reactive component comprising,
      (1) from 30–80% by weight, based on 100% by weight (B), of a high molecular weight hydroxyl-terminated polyether polyol having a molecular weight of about 400 to about 4000 g/mol and having a functionality of about 2, and
      (2) from 70–20% by weight, based on 100% by weight (B), of a high molecular weight hydroxyl-terminated polyether polyol having a molecular weight of about 400 to about 6000 g/mol and having a functionality of about 3,
   at an isocyanate index of about 70 to about 130.

7. The coated substrate of claim 6, wherein the reaction of (A) and (B) occurs in the presence of at least one of a catalyst and/or a desiccant.

8. The coated substrate of claim 6, wherein the isocyanate index is about 80 to about 110.

9. The coated substrate of claim 6, wherein the isocyanate index is about 90 to about 105.

10. The coated substrate of claim 6, wherein the allphatic or aromatic alcohol is selected from the group consisting of isomeric butanols, isomeric propanols, isomeric pentanols, isomeric hexanols, cyclohexanol, 2-methoxyethanol, 2-bromoethanol, phenol, 1-naphthanol, m-cresol and p-bromophenol.

11. The coated substrate of claim 6, wherein the substrate is selected from glass, ceramic or metal.

12. The coated substrate of claims 6, wherein the substrate is metal.

13. The coated substrate of claim 6, wherein the composition is applied by at least one of spray-coating, spread-coating, flood-coating, dip-coating, roll-coating or casting.

* * * * *